US012117833B2

(12) United States Patent
Thakur (10) Patent No.: US 12,117,833 B2
(45) Date of Patent: Oct. 15, 2024

(54) CLIENT CONTROL FOR AN AUTONOMOUS VEHICLE RIDESHARING SERVICE

(71) Applicant: GM Cruise Holdings LLC, San Francisco, CA (US)

(72) Inventor: Divya Thakur, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 187 days.

(21) Appl. No.: 16/407,954

(22) Filed: May 9, 2019

(65) Prior Publication Data
US 2020/0356090 A1 Nov. 12, 2020

(51) Int. Cl.
*G05D 1/00* (2024.01)
*B60W 50/08* (2020.01)
*G01C 21/34* (2006.01)
*G06V 20/58* (2022.01)

(52) U.S. Cl.
CPC ......... *G05D 1/0061* (2013.01); *B60W 50/087* (2013.01); *G01C 21/3438* (2013.01); *G06V 20/58* (2022.01); *B60W 2555/60* (2020.02)

(58) Field of Classification Search
CPC ......... G05D 1/0061; G05D 2201/0213; G01C 21/3438; G06K 9/00805; B60W 50/087; B60W 2555/60
See application file for complete search history.

(56) References Cited

U.S. PATENT DOCUMENTS 10,048,700 B1 * 8/2018 Curlander ............ G08G 1/0116
2003/0109263 A1 * 6/2003 Sziraki .................. G01C 21/26
455/457

(Continued)

FOREIGN PATENT DOCUMENTS

DE 102016012774 A1 5/2017
DE 102016211646 A1 12/2017

(Continued)

OTHER PUBLICATIONS

"Davies, GM Will Launch Robocars Without Steering Wheels Next Year, Jan. 14, 2018, Wired (archived by archive.org), https://web.archive.org/web/20180114051451/https://www.wired.com/story/gm-cruise-self-driving-car-launch-2019/" (Year: 2018).*

(Continued)

*Primary Examiner* — Dale W Hilgendorf
*Assistant Examiner* — Frank T Glenn, III (57) ABSTRACT

Systems and methods systems provide for client control over an Autonomous Vehicle (AV). The AV can determine sets of mechanical operations that it can take at a future time. The AV can determine a ranking for each of the sets of mechanical operations, including a first ranked set and at least one second ranked set. Client or user selection can be given a certain score, weight, or other value. The AV can apply the value to the second ranked set to determine an adjusted ranking. If the adjusted ranking outranks a ranking of the first ranked set, then the AV can expose the first ranked set and the second ranked set to a client interface. If the AV receives a selection of the second ranked set, the AV can perform that set of mechanical operations. Otherwise, the AV can perform the first ranked set of mechanical operations.

20 Claims, 7 Drawing Sheets

(56) References Cited

U.S. PATENT DOCUMENTS

| | | | |
|---|---|---|---|
| 2007/0150174 A1* | 6/2007 | Seymour | G01C 21/3617 |
| | | | 701/532 |
| 2007/0193798 A1* | 8/2007 | Allard | B60T 7/22 |
| | | | 180/169 |
| 2014/0310075 A1* | 10/2014 | Ricci | G06F 16/252 |
| | | | 705/13 |
| 2017/0285647 A1 | 10/2017 | Saito et al. | |
| 2018/0059687 A1* | 3/2018 | Hayes | G08G 1/096816 |
| 2019/0015976 A1* | 1/2019 | Sweeney | B25J 9/1602 |
| 2019/0049961 A1* | 2/2019 | Battles | G08G 1/163 |
| 2019/0064813 A1* | 2/2019 | Binet | G05D 1/0088 |
| 2019/0126937 A1 | 5/2019 | Moon et al. | |
| 2019/0360833 A1* | 11/2019 | Liu | G06Q 10/02 |
| 2020/0026279 A1* | 1/2020 | Rhodes | G01C 21/3697 |
| 2020/0217679 A1* | 7/2020 | DeLuca | G01C 21/3484 |

FOREIGN PATENT DOCUMENTS

| | | | | |
|---|---|---|---|---|
| EP | 3339127 A1 | 6/2018 | | |
| WO | WO-2015112752 A1 * | 7/2015 | ......... | G01C 21/3626 |

OTHER PUBLICATIONS

International Search Report and Written Opinion for International Application No. PCT/US2019/068350, mailed Apr. 3, 2020, 10 pages.

* cited by examiner

CLIENT CONTROL FOR AN AUTONOMOUS VEHICLE RIDESHARING SERVICE

TECHNICAL FIELD

The subject matter of this disclosure relates in general to the field of autonomous vehicles, and more particularly, to systems and methods for client control of an Autonomous Vehicle (AV) of an AV ridesharing service.

BACKGROUND

An AV is a motorized vehicle that can navigate without a human driver. The AV can include a plurality of sensor systems, such as a camera sensor system, a Light Detection and Ranging (LIDAR) sensor system, and a Radio Detection and Ranging (RADAR) sensor system, among others. The AV may operate based upon sensor signals output by the sensor systems. For example, the sensor signals can be provided to a local computing system in communication with the plurality of sensor systems and a processor can execute instructions based upon the sensor signals to control one or more mechanical system of the AV, such as a vehicle propulsion system, a braking system, a steering system, and so forth.

From time to time, an AV may encounter unfamiliar or difficult traffic conditions and may not be as quick to respond as desired by a passenger and/or the passenger may wish to have more control over the AV. However, passengers may not be familiar with the traffic ordinances of a particular city, misapprehend the dangers of current driving conditions, overestimate their own abilities to maneuver out of a tricky situation, and so forth. Indeed, the phenomenon of the so-called backseat driver who excessively comments on a driver's actions and decisions is well-known. Finding the right balance in whose judgment should prevail as between AV and passenger has thus far been an intractable problem to solve in the AV industry.

BRIEF DESCRIPTION OF THE FIGURES

To provide a more complete understanding of the present disclosure and features and advantages thereof, reference is made to the following description, taken in conjunction with the accompanying drawings, in which.

DETAILED DESCRIPTION

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

The present technology can involve the gathering and use of data available from various sources to improve quality and experience. The present disclosure contemplates that in some instances, this gathered data may include personal information. The present disclosure contemplates that the entities involved with such personal information respect and value privacy policies and practices.

A ridesharing service (also sometimes referred to as a Transportation Network Company (TNC) service, Mobility Service Provider (MSP) service, ride-hailing service, etc.) can match passengers with drivers via websites, mobile applications or "apps," and other client interfaces. An Autonomous Vehicle (AV) ridesharing service may rely on a fleet of AVs to provide a virtual driver and the vehicle for the service. An AV can offer various advantages over human drivers. The AV never tires and is never distracted or impaired. The AV operates more predictably to others on the road with the AV, and thus more safely. The AV can be programmed to optimize for fuel or battery utilization or other efficiencies. The AV can coordinate more easily with other vehicles and enjoy the network effects of such possibilities (e.g., reduced traffic congestion, optimized road capacity, more efficient parking, etc.). There may be occasions, however, when a passenger would like to have more control over the AV during a trip, such as when the AV runs into a tricky driving situation and takes longer than desired to respond, comes across circumstances in which the AV can select from multiple options but makes a decision that may not be the preferred outcome for the passenger, encounters a traffic scenario and operates in an overly biased manner towards certain outcomes, and the like.

Passengers may not always exercise the best judgment, especially during stressful situations requiring split-second decisions. In many cases, the AV may be in a better position to make the most rational and optimal driving decisions. Thus, there may be little reason for the AV to ever cede control to passengers. In other cases, AV may not be equipped with human driver actuators (e.g., steering wheel, handbrake, foot brake pedal, foot accelerator pedal, turn signal lever, window wipers, etc.) and/or other equipment (e.g., rearview mirror, side view mirrors, window wipers, etc.) such that it may not be possible or safe for a passenger to take control of the AV.

Various embodiments of the present disclosure can overcome the above and other deficiencies of the prior art in the field of AV control. In particular, systems and methods enable an AV to receive real-time or near real-time feedback from an AV ridesharing service user (e.g., a passenger, a human co-pilot, a parent or guardian of a child passenger or other privileged remote user, a delivery customer, etc.) for controlling aspects of the AV's mechanical systems. The AV can determine multiple sets of one or more mechanical operations that it can take at a future time based on the location, direction, and speed of the AV, map and routing information, objects and events detected around the AV, and other information about the state of the AV and its environment. The AV may ensure that each set of mechanical operations is safe (e.g., avoids a collision, the predicted outcome exceeds a safety threshold, consistent with safety standards, etc.) and legal in the jurisdiction at which the AV is located. In addition, the AV may ensure that each set of mechanical operations is effective under current environmental conditions, the predicted outcome of each set of mechanical operations satisfies certain objectives of the AV ridesharing service or trip conditions set by the user, and the like.

The AV can evaluate whether a user can help with selection of the set of mechanical operations that the AV actually performs (i.e., whether the user can override a default set or an AV-selected set of mechanical operations). For example, the AV can determine a ranking for each of the multiple sets of mechanical operations based on the AV ridesharing service's objectives, trip conditions, and other rules or preferences. The ranked sets of mechanical operations can include a first ranked set and one or more lower ranked sets (e.g., second, third, fourth, etc.). To factor the user into account for how to operate the AV, client or user selection can be given a certain score, weight, or other value. The AV can apply the value to one or more of the lower ranked sets of mechanical operations to determine adjusted rankings for the lower ranked sets.

If the adjusted ranking of at least one lower ranked set outranks a ranking of the first ranked set, then the AV can expose the first ranked set and any of the lower ranked sets whose adjusted ranking outranks the ranking of the first ranked set to a client interface. The client interface can include a Graphical User Interface (GUI) including elements corresponding to the multiple sets of mechanical operations displayed on a user's mobile computing device (e.g., smart phone, smart watch, smart glasses or other head-mounted display, etc.) or on one or more tablets or other computing devices including one or more touchscreens integrated with the AV, a Voice User Interface (VUI) (e.g., executing on the user's mobile device, a computing device including one or more microphones integrated with the AV, etc.) that can accept voice commands corresponding to the multiple sets of mechanical operations, or a gesture-based user interface (e.g., executing on the user's mobile device or a computing device including one or more image sensors integrated with the AV, etc.) that can recognize gestures corresponding to the multiple sets of mechanical operations, among other types of interfaces.

If the AV receives a selection of a particular set of mechanical operations (e.g., one or more taps on the GUI element corresponding to that set of mechanical operations, a voice command corresponding to that set of mechanical operations, a gesture corresponding to that set of mechanical operations, etc.), the AV can perform that set of mechanical operations (i.e., the user-selected set of mechanical operations). Otherwise, the AV can perform the first ranked set of mechanical operations (i.e., the AV-selected set of mechanical operations).

Figure 1:
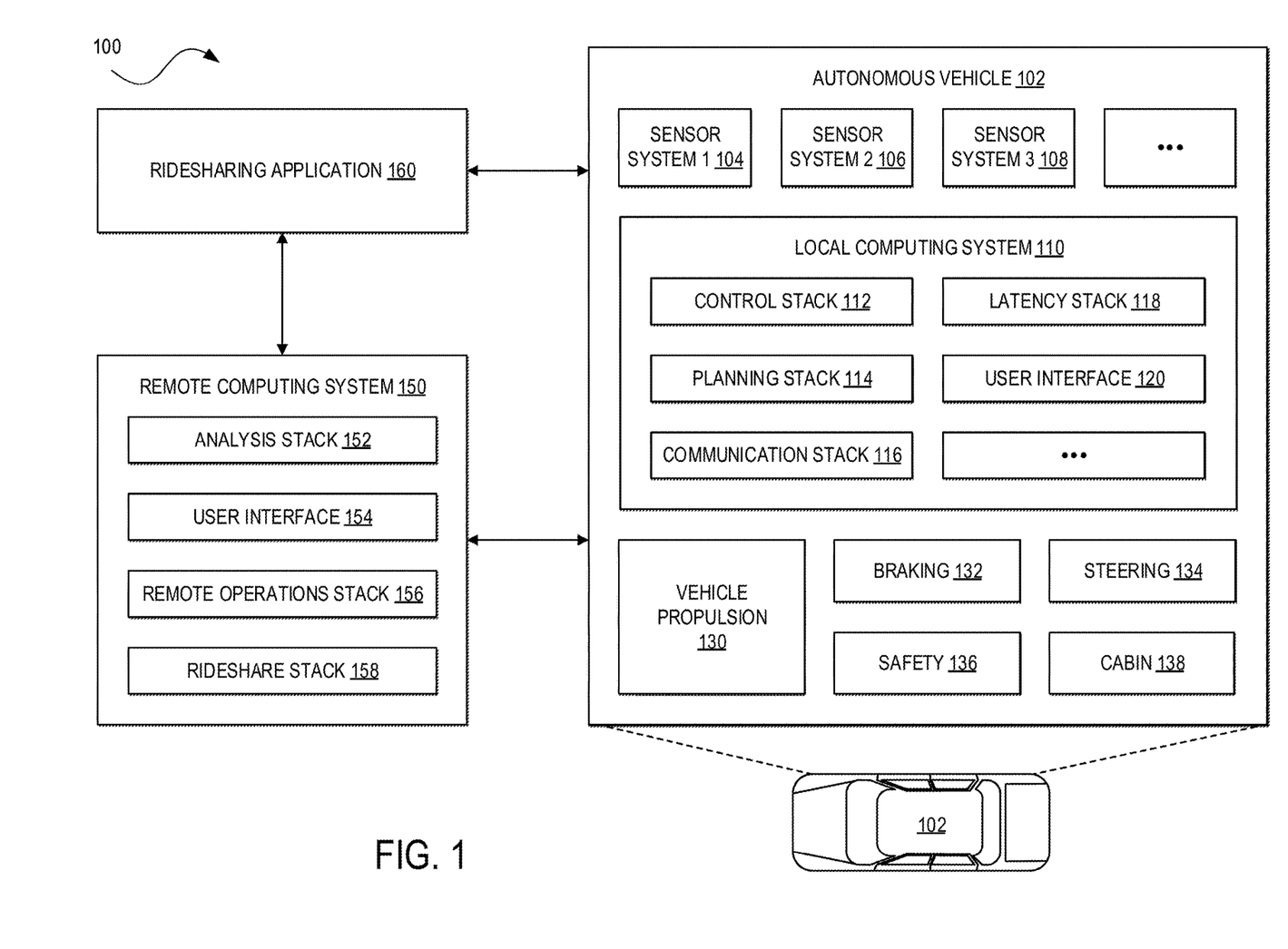
FIG. 1 illustrates an example of a system for an Autonomous Vehicle (AV) ridesharing service in accordance with an embodiment.

Turning now to the drawings, FIG. 1 illustrates an example of a system for an AV ridesharing service 100. One of ordinary skill in the art will understand that, for the AV ridesharing service 100 and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In general, the AV ridesharing service 100 is a dispatching system and user-to-vehicle matching solution designed to provide ridesharing, delivery (e.g., documents, packages, food, etc.), and similar services via a fleet of AVs. In this example, the AV ridesharing service 100 includes an AV 102, a remote computing system 150, and a ridesharing application 160. The AV 102, the remote computing system 150, and the ridesharing application 160 can communicate with each other over one or more networks, such as a public network (e.g., a public cloud, the Internet, etc.), a private network (e.g., a local area network, a private cloud, a virtual private network, etc.), and/or a hybrid network (e.g., a multi-cloud or hybrid cloud network, etc.).

The AV 102 can navigate about roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measuring Units (IMUs) (e.g., accelerometers, gyroscopes, magnetometers, etc.), image sensors (e.g., still image cameras, video cameras, etc.), light sensors (e.g., LIDAR systems, ambient light sensors, infrared sensors, etc.), Global Positioning System (GPSs), RADAR systems, audio sensors (e.g., microphones, Sound Navigation and Ranging (SONAR) systems, ultrasonic sensors, etc.), speedometers, tachometers, odometers, altimeters, tilt sensors, impact sensors, seat occupancy sensors, open/closed door sensors, temperature sensors, pressure sensors, rain sensors, and so forth. In this example, the sensor system 104 can be a RADAR system, the sensor system 106 can be a first image sensor system (e.g., still image or video cameras), and the sensor system 108 can be a second image sensor system (e.g., LIDAR system). Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., GUIs, VUIs, etc.) for controlling certain aspects of the mechanical systems 130-138.

The AV 102 can additionally include a local computing system 110 that is in communication with the sensor systems 104-108, the mechanical systems 130-138, the remote computing system 150, and the ridesharing application 160, among other systems. The local computing system 110 can include one or more processors and memory including instructions that can be executed by the one or more processors. The instructions can make up one or more software stacks or systems responsible for controlling the AV 102, communicating with the remote computing system 150, the ridesharing application 160, and other systems, receiving inputs from users, logging metrics collected by the sensor systems 104-108 and users, and so forth. In this example, the local computing system 110 includes a control stack 112, a planning stack 114, a communication stack 116, a latency stack 118, and a user interface 120, among other stacks and systems.

The control stack 112 can manage the operation of the vehicle propulsion system 130, the braking system 132, the steering system 134, the safety system 136, and the cabin system 138. The control stack 112 can receive sensor signals from the sensor systems 104-108 as well as communicate with other stacks of the local computing system 110 to effectuate operation of the AV 102. In some embodiments, the control stack 112 may carry out operations in concert with one or more other stacks or systems of the AV 102.

The planning stack 114 can determine how to maneuver or operate the AV 102 safely in its environment. For example, the planning stack 114 can be provided with the location, speed, and direction of the AV 102, map or route information, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another. The planning stack 114 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 114 can select from multiple backup plans to carry out. For example, while preparing to change lanes to turn right at an intersection, another vehicle may aggressively cut into the destination lane, making the lane change unsafe. The planning stack 114 would have already determined an alternative plan for such an event, and upon the event occurring, help to direct the AV 102 to go around the block instead of blocking its current lane while waiting for an opening to change lanes. In some embodiments, the planning stack 114 can be a part of the control stack 112.

The communication stack 116 can transmit and receive signals between the stacks and systems of the AV 102 and between the AV 102 and the remote computing system 150, the ridesharing application 160, and other remote systems. The communication stack 116 can enable the local computing system 110 to exchange information remotely over a network, such as through an antenna array or interface that can provide municipal Wi-Fi, cellular (e.g., Third Generation (3G), Fourth Generation (4G), Long-Term Evolution (LTE), 5th Generation (5G), etc.), or other wireless Wide Area Network (WAN) or remote connection. The communication stack 116 can also facilitate local exchange of information, such as through a wired connection (e.g., a user's mobile computing device docked in an in-car docking station or connected via Universal Serial Bus (USB), the local computing system 110, etc.) or a local wireless connection (e.g., Wireless Local Area Network (WLAN), Bluetooth®, infrared, etc.). In some embodiments, the communication stack 116 can be configured to exchange information locally when a user's mobile computing device is within a certain range of the AV 102. For example, when the user's mobile computing device is located within a certain range of the AV 102, the AV 102 can configure the user's device (e.g., via the ridesharing application 160) and/or the local computing system 110 to use a local connection to more directly communicate with the AV 102. This can reduce latency that may otherwise accrue by exchanging information over a remote network connection, reduce bandwidth usage and utilization of other computing resources (e.g., processing, memory, storage, power, etc.) that may otherwise be consumed for enabling remote connectivity, and increase security and dependability by foregoing remote networking, among other advantages.

The latency stack 118 can utilize timestamps on communications to and from the remote computing system 150 to determine if a communication has been received from the remote computing system 150 in time to be useful. For example, when a stack of the local computing system 110 requests feedback from the remote computing system 150 on a time-sensitive basis, the latency stack 118 can determine if a response was timely received from the remote computing system 150 as information can quickly become too stale to be actionable. When the latency stack 118 determines that a response has not been received within a threshold, the latency stack 118 can enable other stacks or systems of the AV 102 or a user to make necessary decisions or to provide the needed feedback.

The user interface 120 can exchange information with a user for how to operate the AV 102. In some embodiments, the user may be asked to evaluate and override an AV-selected set of mechanical operations determined by the planning stack 114, or the user may wish to provide an instruction to the AV 102 regarding destinations, requested routes, or other requested operations. The user interface 120 can be provided locally via the local computing system 110 and/or the ridesharing application 160 executing on a passenger's mobile computing device and/or remotely via the remote computing system 150 and/or the ridesharing application 160 executing on a remote user's computing device.

The remote computing system 150 can send and receive various signals to and from the AV 102. These signals can include reporting data for training and evaluating machine learning algorithms, requesting assistance from the remote computing system 150 or a human operator via the remote computing system 150, software stack updates, ridesharing pick-up and drop-off instructions, and so forth. In this example, the remote computing system 150 includes an analysis stack 152, a user interface 154, a remote operations stack 156, and a ridesharing service stack 158, among other stacks and systems.

The analysis stack 152 can receive data from the AV 102 and analyze the data to train or evaluate machine learning algorithms for operating the AV 102. The analysis stack 152 can also perform analysis pertaining to data associated with one or more errors or constraints reported by the AV 102.

The user interface 154 can present metrics, video, pictures, sounds, and so forth that are reported from the AV 102 to a human operator of the remote computing system 150. The user interface 154 can further receive input instructions from a human operator that can be sent to the AV 102.

The remote operations stack 156 can generate and transmit instructions regarding the operation of the AV 102. For example, in response to an output of the analysis stack 152 or the user interface 154, the remote operations stack 156 can prepare instructions for one or more stacks or systems of the AV 102.

The ridesharing service stack 158 can interact with the ridesharing application 160 operating on client computing devices, such as computing servers, desktops, laptops, tablets, smartphones, smart wearable devices (e.g., smart watches, smart eyeglasses or other Head-Mounted Displays (HMDs), smart ear pods or other smart in-ear, on-ear, or over-ear devices, etc.), gaming systems, or other general purpose computing devices. The client computing devices may be users' mobile computing devices or computing devices integrated with the AV 102 (e.g., the local computing system 110). The ridesharing service stack 158 can receive requests to be picked up or dropped off from the ridesharing application 160 and dispatch the AV 102 for the trip. The ridesharing service stack 158 can also act as an intermediary between the ridesharing application 160 and the AV 102 when a user provides instructions to the AV 102 to go around an obstacle, change routes, honk the horn, and so forth.

Figure 2:
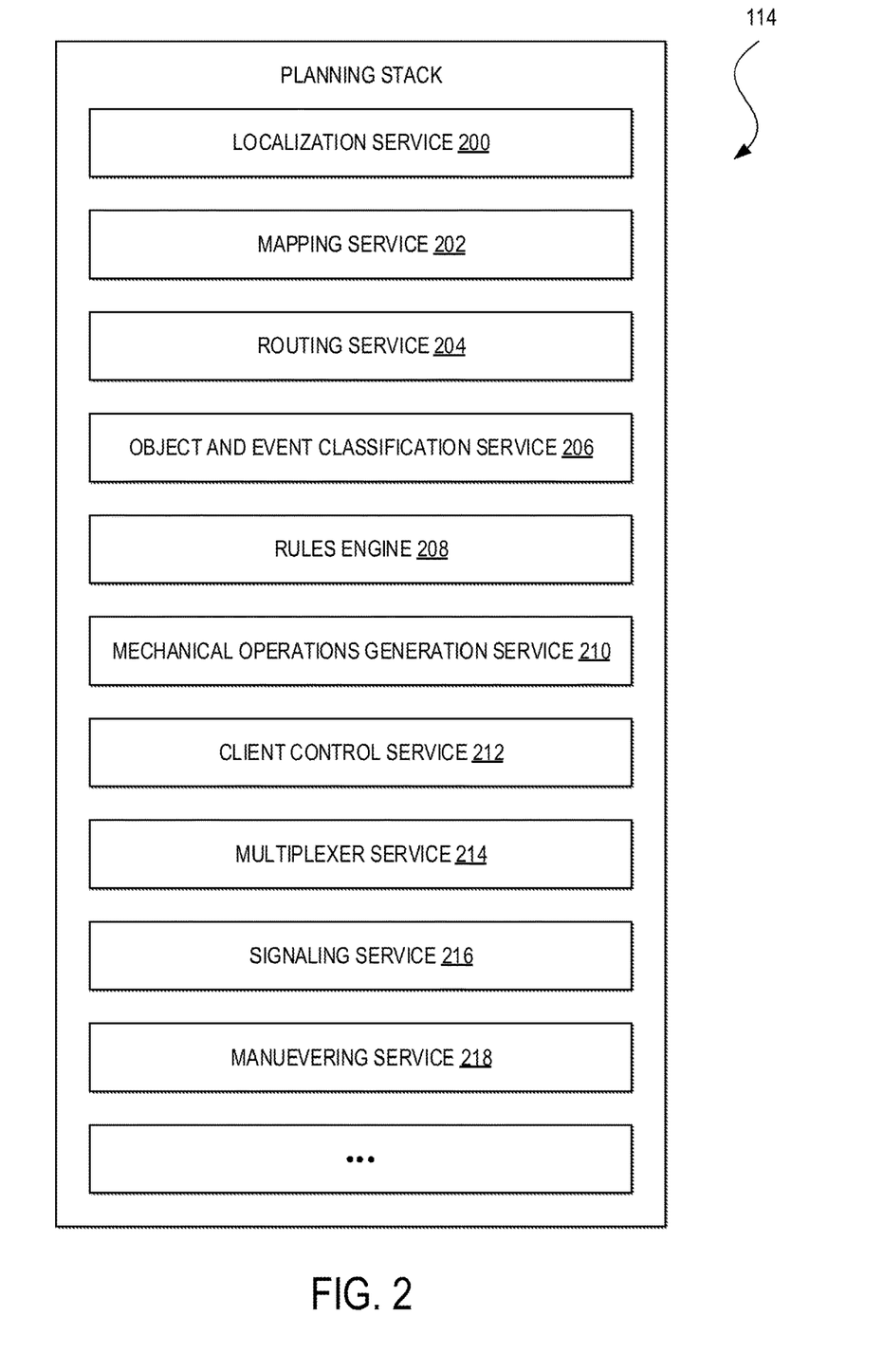
FIG. 2 illustrates an example of a planning stack for an AV in accordance with an embodiment.

FIG. 2 illustrates an example of the planning stack 114. One of ordinary skill in the art will understand that the services and other elements of the planning stack 114 may depend from, integrate with, or extend other stacks or systems of the AV 102. In addition, the planning stack 114 is but one example for implementing planning for the AV 102, and one of ordinary skill in the art will understand how to apply the general principles disclosed herein to other embodiments without departing from the scope of the present disclosure.

At a high level, the planning stack 114 can determine the desired behavior for the AV 102 in its current environment. The planning stack 114 may identify the sets of mechanical operations that need to be conducted to navigate the AV 102 from one point to another. The planning stack 114 may have knowledge of the geographical location of the AV 102, the rules of the road, and how to interpret information about traffic controls, road markings, and so on. The planning stack 114 can integrate the dynamic world with the known mapped world into directives that ensure the AV 102 is controlled in a collision-free, safe, and efficient manner. To this end, the planning stack 114 can include a localization service 200, a mapping service 202, a routing service 204, an object and event classification service 206, a rules engine 208, a mechanical operations generation service 210, a client control service 212, a multiplexer service 214, a signaling service 216, and a maneuvering service 218, among other services or elements.

The localization service 200 can determine the AV's location, speed, direction, and the like from the sensor systems 104-108 (e.g., GPS, cameras, LIDAR, RADAR, IMUs, speedometer, tachometer, etc.) and/or other data sources. For example, if the localization information from one system is unavailable, the AV 102 can use localization information from a redundant system and/or from other sources (e.g., a cellular network, a Wi-Fi network, etc.). The localization service 200 can also determine the locations of users of the AV ridesharing service 100 or the users' mobile computing devices.

The mapping service 202 can maintain high-definition maps of the roads upon which the AV 102 travels, including the type of road (e.g., highway, one-way road, street, etc.), road infrastructure (e.g., sidewalks, traffic lights, traffic signs, tolls, etc.), lane information (e.g., number of lanes, carpool lane, High Capacity Transit (HCT) lane, bicycle lane, etc.), road grade and slope, and the like. The mapping service 202 can also maintain information regarding undriveable areas (e.g., areas with no roads, areas outside the boundaries of the AV ridesharing service 100, etc.). In addition, the mapping service 202 can exchange updates regarding traffic conditions (e.g., congestion, accidents, construction detours, etc.), road infrastructure conditions (e.g., potholes, road kill, roads requiring fresh striping, defaced stop signs, non-functional traffic lights, etc.), and so forth with other AVs, the remote computing system 150, the ridesharing application 160, and the like.

The routing service 204 can select the best possible lane-specific route that the AV 102 can take to a destination, such as a pick-up or drop-off location, a refueling or recharging station, a parking spot, and so forth.

The object and event classification service 206 can enable the AV 102 to "see" (e.g., via cameras, infrared sensors, LIDAR, etc.), "hear" (e.g., via microphones, ultrasonic sensors, etc.), and "feel" (e.g., RADAR, pressure sensors, force sensors, impact sensors, etc.) its environment. The object and event classification service 206 can detect and classify objects and events (e.g., other vehicles, blockages, bicycles, emergency vehicles, traffic lights, pedestrians, buses, trains, trolleys, etc.) to determine their current and predicted locations, speeds, directions, and the like. In addition, the object and event classification service 206 can determine the free space around the AV 102 to maintain a safe distance from other objects, change lanes, park the AV 102, and so forth. The object and event classification service 206 can also identify environmental uncertainties, such as where to look for moving objects, flag areas that may be obscured or blocked from view, and so on.

The rules engine 208 can comprise various driving and safety rules by which the AV 102 may adhere, such as traffic laws, safety standards, collision avoidance rules, AV ridesharing service objectives (e.g., fuel or battery efficiency, maximizing utilization of the AV 102 fleet, maximizing the number of trips, maximizing fares, etc.), trip conditions (e.g., maximum trip time, maximum trip fare, minimum distance from a refueling or recharging station, etc.), and so forth.

The mechanical operations generation service 210 can determine multiple sets of one or more mechanical operations the AV 102 can perform for one or more future time intervals based on data from the localization service 200, the mapping service 202, the routing service 204, the object and event classification service 206, the rules engine 208, the client control service 212, the signaling service 216, and so on. As a simple example, if the AV 102 is currently in the right lane of a two-way street with two lanes on each side of the street driving at the speed limit and needing to make a left turn within the next mile, the sets of mechanical operations can include turning left at the next intersection (e.g., turning on the left blinker, changing to the left lane, decelerating, and turning left at the next intersection), staying in the current lane at a specified rate of acceleration (e.g., maintaining the same speed or decelerating), or turning right at the next intersection to take an alternative route (e.g., turning on the right blinker, decelerating, and turning right), and so on.

If the object and event classification service 206 detects another vehicle in the left lane traveling at the speed limit and the rules engine 208 specifies that the AV 102 cannot exceed the speed limit and must maintain a threshold distance when following another vehicle at the other vehicle's current speed, the sets of mechanical operations may include turning left at the next available intersection (e.g., turning on the left blinker, decelerating until the other vehicle is the threshold distance ahead of the AV 102, changing to the left lane, and turning left at the next available intersection), staying in the current lane at a specified right of acceleration, turning right at the next intersection, and so forth. Other examples of the sets of mechanical operations can include options for handling driving blockages (e.g., honking the horn, high-beaming, going around the blockage, etc.), specific pick-up or drop-off locations, routes to a pick-up or drop-off location, or other operations for controlling the AV's mechanical systems.

The mechanical operations generation service 210 can filter out or eliminate sets of mechanical operations based on rules set forth in the rules engine 208, such as to avoid occupying the same space as other objects, abide by traffic laws, take precautionary measures when there are occluded areas, and the like. The mechanical operations generation service 210 can also determine a ranking for each set of mechanical operations based on the rules or preferences of the rules engine 208, such as lane preferences, route preferences, the goals of the AV ridesharing service, user preferences for a trip, and so forth.

When the mechanical operations generation service 210 determines there are multiple sets of mechanical operations the AV 102 can safely and legally carry out, the client control service 212 can evaluate whether a user can help the AV 102 to select from one of many possible sets of mechanical operations that the AV 102 can perform at a future time (e.g., whether the user can override a default set of mechanical operations selected by the AV 102 to perform at the future time). For example, given multiple sets of mechanical operations the AV 102 can perform at the future time, the mechanical operations generation service 210 can determine a first ranked set and at least one second ranked set. Client or user selection can be given a certain score, weight, or other value. The client control service 212 can apply this value to the at least one second ranked set to determine an adjusted ranking. If the adjusted ranking of the at least one second ranked set outranks the ranking of the first ranked set, then the client control service 212 can expose the first ranked set and the at least one second ranked set for selection by the user. For instance, the client control service 212 can integrate with various client interfaces (e.g., the user interface 120 of the local computing system 110, the ridesharing application 160, etc.) to enable users of the AV ridesharing service 100 to interact with the AV 102 before, during, and after a trip, and can expose the first ranked set and the least one second ranked set via the client interfaces.

If the mechanical operations generation service 210 determines there is only one set of mechanical operations that the AV 102 can perform at a given time, or if the client control service 212 exposes multiple sets of mechanical operations via a client interface but the client interface does not receive any input within a specified time period, the multiplexer service 214 can select the first ranked set of mechanical operations for the AV 102 to perform (i.e., the default set of mechanical operations or the AV 102-selected set of mechanical operations). If the client control service 212 exposes multiple sets of mechanical operations and the client interface receives a selection of one these sets of mechanical operations within the specified time period, then the multiplexer service 214 can choose the set of mechanical operations selected via the client interface.

The AV 102 can trigger the signaling service 216 in anticipation of certain sets of mechanical operations or confirm a signaling state before performing certain sets of mechanical operations. For example, the signaling service 216 can engage the AV's turn signals when the multiplexer service 214 elects to make a turn, change lanes, pullover the AV 102, and so forth.

The maneuvering service 218 can convert the set of mechanical operations selected by the multiplexer service 214 to commands for the actuators that control the vehicle propulsion system 130, the braking system 132, the steering system 134, the safety system 136, the cabin system 138, and so forth. The maneuvering service 218 can also ensure full vehicle maneuverability complete with stability, traction, and anti-lock brake systems fully active.

Figure 3A:
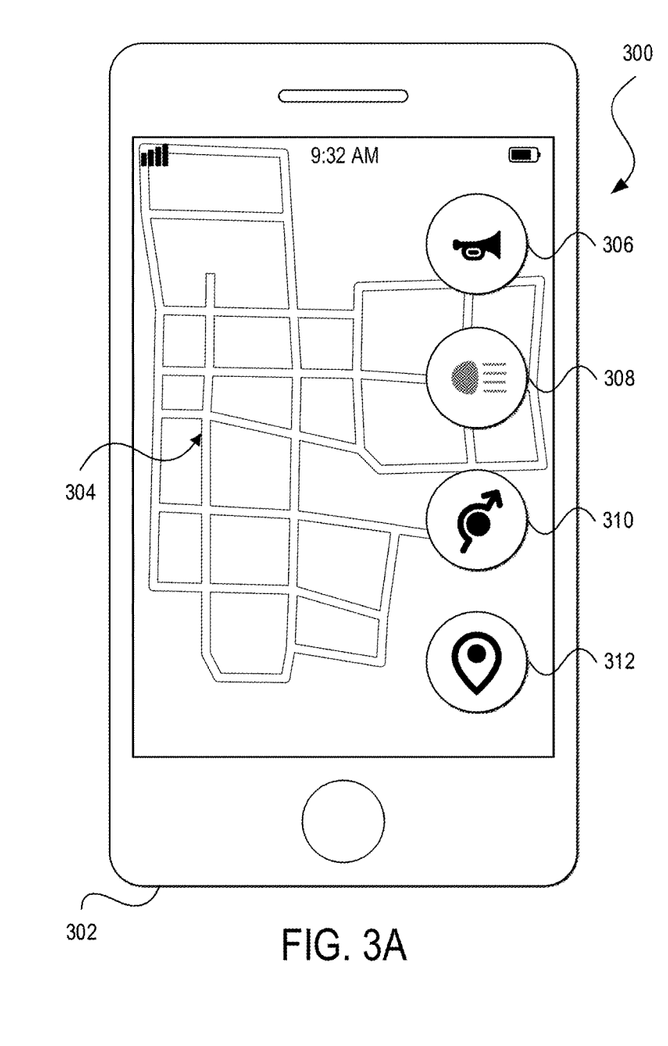
FIGS. 3A-3C illustrate examples of graphical user interfaces for a client application of an AV ridesharing service in accordance with an embodiment.
Figure 3B:
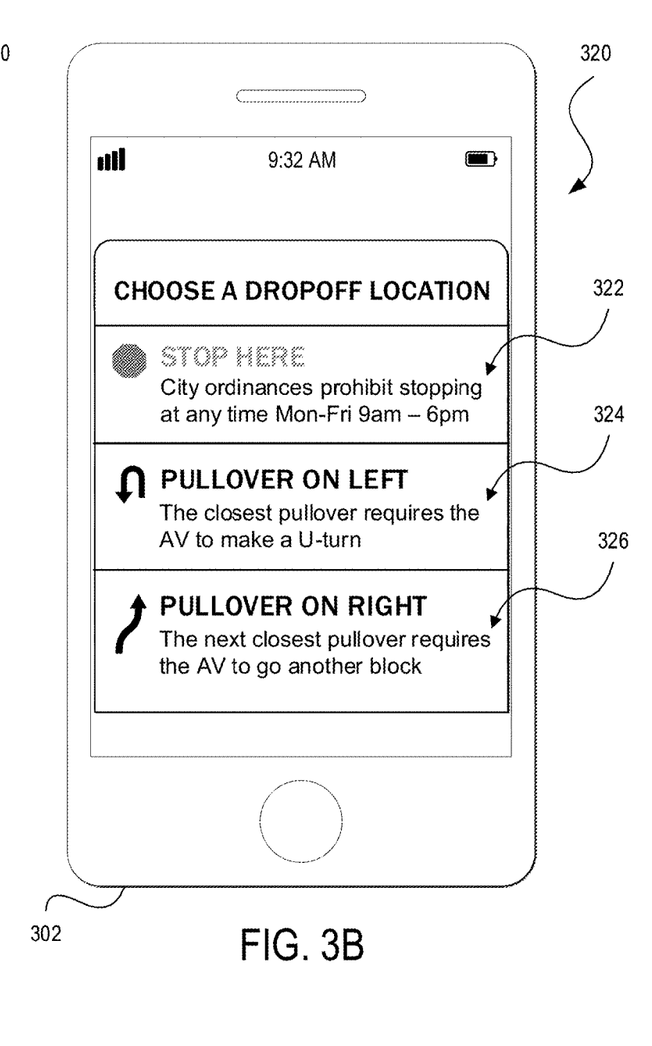
Figure 3C:
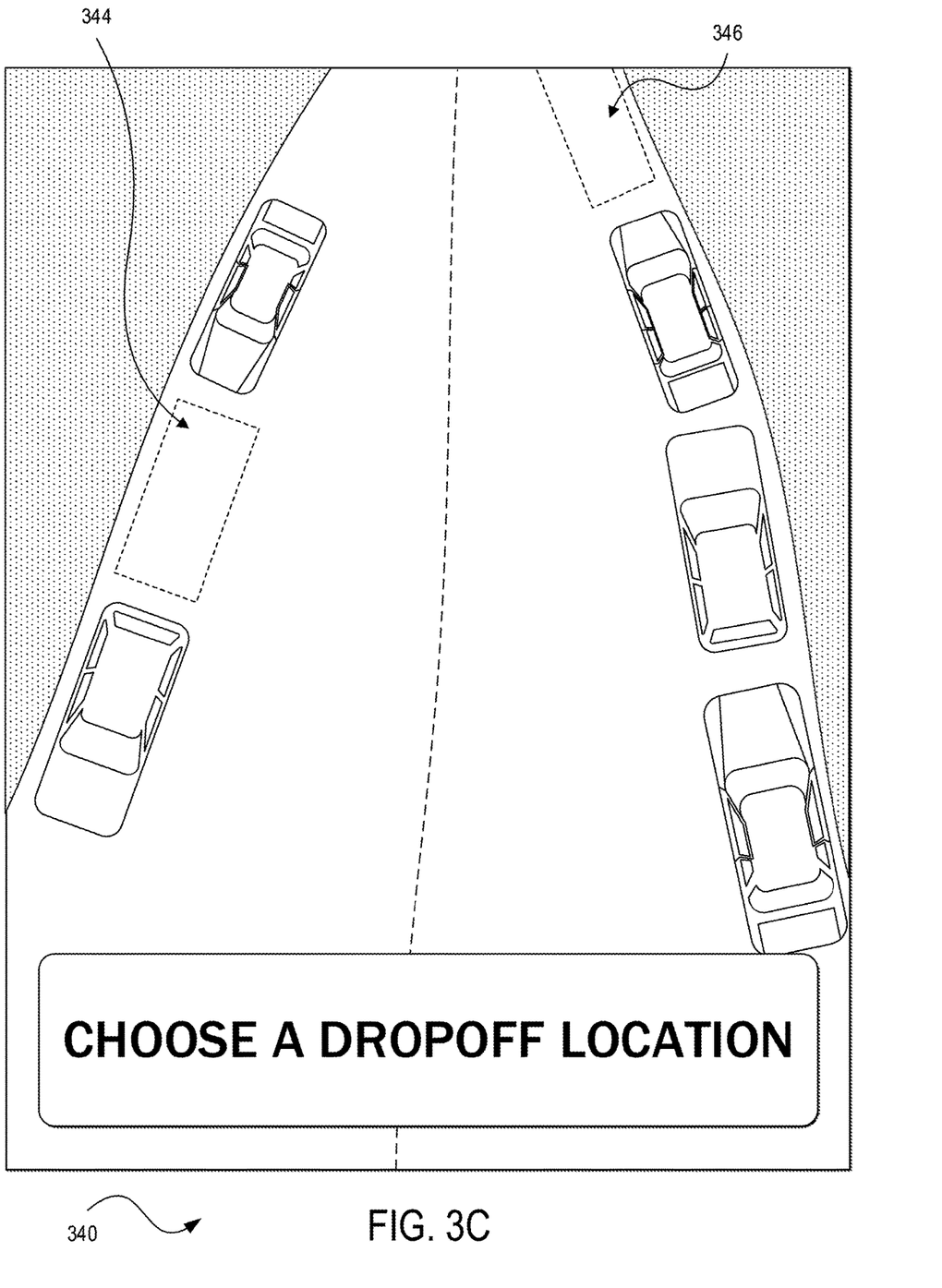

FIGS. 3A-3C illustrate examples of graphical user interfaces for a client application (e.g., the user interface 120 of the local computing system 110, the ridesharing application 160, etc.) of the AV ridesharing service 100. The client application can enable a user to control certain aspects of the mechanical systems 130-138 of the AV 102 before, during, and after a trip provided by the service. Although FIGS. 3A-3C show graphical user interfaces of a mobile application or app executing on a smart phone or tablet, the principles disclosed in the present disclosure are widely applicable to client devices of other form factors, including large form-factor general purpose computing devices (e.g., servers, workstations, desktops, laptops, etc.), other small form-form factor general purpose computing devices (e.g., smart watches, smart glasses, smart ear pods, other wearable devices, etc.), smart displays, smart speakers, televisions, and other electronic devices including input/output components to enable a user to interact with the AV 102. Other embodiments may also be implemented as a web application that can be accessed through a web browser or integrated as a user interface element of another client application (e.g., app actions, shortcuts, widgets, plug-ins, webpage action buttons, etc.). One of ordinary skill will also understand that the user interfaces of FIGS. 3A-3C are but one example of possible user interfaces of a client application for the AV ridesharing service 100. Other embodiments may include a fewer number or a greater number of elements and/or utilize different types of user interfaces, such as VUIs, gesture-based user interfaces (e.g., sign language, pointing gestures, thrusting open palm forward to indicate a stop, etc.), physical actuators or buttons, and so forth.

FIG. 3A illustrates an example of a graphical user interface 300 of the client application for the AV ridesharing service 100 displayed on a mobile computing device 302. The mobile computing device 302 may be owned by a user or may be integrated with the AV 102 for use during a trip provided by the service. For instance, the graphical user interface 300 can enable the user to control aspects of the mechanical systems 130-138 of the AV 102 when appropriate before, during, or after the trip. In this example, the AV 102 may present the graphical user interface 300 when the AV 102 encounters a driving blockage, such as a double-parked car in the AV's current lane, construction or street repair, a bus stopped to pick-up or drop-off riders, and so forth.

The graphical user interface 300 can comprise a map 304 displaying the current status of the user's trip and a plurality of user interface elements or virtual buttons that, upon selection, causes the AV 102 to perform a set of one or more mechanical operations corresponding to the selected button. For example, the graphical user interface 300 includes a virtual button 306 for sounding a horn of the AV 102, a virtual button 308 for flashing the high beams of the AV 102, a virtual button 310 for directing the AV 102 to go around the blockage, and a virtual button 312 for rerouting the AV 102, among numerous other possibilities (e.g., changing lanes; navigational directions, such as going straight, turning left, turning right, etc.; change lanes, make a three-point turn instead of a U-turn, stopping the AV 102, pulling the AV 102 over to one side of the road, etc.). In this example, the virtual button 308 for flashing high beams may be "grayed" out or disabled. For instance, the AV 102 may determine that it is currently too sunny in the current environment state around the AV 102 according to an ambient light sensor for the high beams to be effective, and thus the AV 102 may disable the virtual button 308. The AV 102 may determine, however, that it is valid (e.g., safe, legal, effective, efficient, and otherwise appropriate) to sound a horn, go around the blockage, or reroute the AV 102, and thus the AV 102 can activate the virtual buttons 306, 310, and 312, respectively.

In another scenario, the AV 102 may be capable of detecting a noise level around the AV 102 and when the noise level exceeds a threshold, the AV 102 may disable selection of the virtual button 306 because it may not be heard above the detected noise level to be effective. In other scenarios, the AV 102 may determine that it is not safe to go around the blockage and disable the virtual button 310 or the AV 102 may determine there is only one route to its destination and the AV 102 can disable the virtual button 312. In other embodiments, the AV 102 may only display a virtual button (or other user interface element) when the AV 102 can perform the corresponding set of mechanical operations at the behest of the user (instead of always displaying the virtual buttons and disabling the buttons of unavailable sets of mechanical operations).

In some embodiments, the AV 102 may solicit or prompt the user to select from one of multiple sets of mechanical operations for the AV 102 to perform. For example, the AV 102 may come across a driving situation with multiple valid responses, and the AV 102 may explicitly request the user to select a preference on how to proceed. In other embodiments, the AV 102 can simply expose the sets of mechanical operations (e.g., display the virtual buttons, configure itself to accept certain voice commands, configure itself to accept certain gestures, etc.), and the user can have the option to select the preferred set of mechanical operations for the AV 102 to perform or to allow the AV 102 to select the set of mechanical operations to perform.

FIG. 3B illustrates another example of a graphical user interface 320 of the client application for the AV ridesharing service displayed on the mobile computing device 302. In this example, the graphical user interface 320 can enable the user to control the AV's behavior when the AV 102 nears an intra-trip or trip destination, such as where drop-off should occur. A similar interface may also be used for selecting a pick-up location. The graphical user interface 320 includes user interface elements or items of a selection list that, upon selection, causes the AV 102 to perform the set of mechanical operations corresponding to the selected list item. For example, the graphical user interface 320 includes a list item 322 for stopping the AV 102, a list item 324 for pulling the AV 102 over onto the left side of the street, and a list item 326 for pulling the AV 102 over onto the right side of the street. In this example, the list item 322 for stopping the AV 102 may be grayed out or disabled. For instance, local city ordinances may prohibit any vehicles from stopping at any time on Mondays through Fridays from 9 am to 6 pm. The AV 102 can include logic for determining that the current time falls within this period, prohibiting itself from stopping the vehicle to abide by the traffic ordinance, and providing information explaining to the user why the AV 102 cannot stop at a specified destination. The AV 102 may determine, however, that it is safe, legal, and otherwise appropriate to pullover to the left or to the right, and thus the AV 102 can activate the list items 324 and 326, respectively.

The graphical user interface 320 can additionally or alternatively include user interface elements that, upon selection, cause the AV 102 to perform sets of mechanical operations for traveling another block for drop-off, going around the block again before drop-off, or otherwise allowing the user to select a different drop-off location. In some embodiments, the graphical user interface 320 can also include a user interface element for directing the AV 102 to wait for a specified time at the drop-off location if the user intends for the destination to be an intra-trip destination (e.g., to drop-off other passengers, pick up additional passengers, run a quick errand, etc.), the user wants the AV 102 to continue video monitoring until the user enters his/her home, and so forth.

FIG. 3C illustrates another example of a graphical user interface 340 of the client application for the AV ridesharing service. The graphical user interface 340 can be a pictorial representation of a situation corresponding to that of FIG. 3B in which the AV 102 may be nearing its destination and giving the user options regarding drop-off. For example, the graphical user interface 340 can include a graphical user interface element 344 that can correspond to the list item 324 (e.g., pulling over to the left) and a graphical user interface element 346 that can correspond to the list item 326 (e.g., pulling over to the right). Although not shown here, the graphical user interface 340 can further include user interface elements that, upon selection, cause the AV 102 to perform sets of mechanical operations for traveling to the next block for drop-off, going around the block again before drop-off, or otherwise allowing the user to select a different drop-off location. However, in contrast to FIG. 3B, the graphical user interface 340 can omit a graphical user interface element corresponding to disabled sets of mechanical operations (e.g., the list item 322 for stopping the AV 102).

In some embodiments, the pictorial representation can utilize real-world image or video data of the set of drop-off (or pick-up) locations, such as image or video data captured by the AV's cameras, image or video data captured by an Unmanned Aerial Vehicle (UAV) controlled by the AV 102, image or video data captured by a street map service, satellite imagery, aerial photography, or image or video data from another data source. Alternatively or in addition, the pictorial representation can comprise computer-generated imagery. The computer-generated imagery may utilize different views (e.g., plan view or bird's eye view, an n-point perspective view, a projective view, etc.), dimensions (e.g., 2D, 2.5D, 3D), and so forth.

Figure 4:
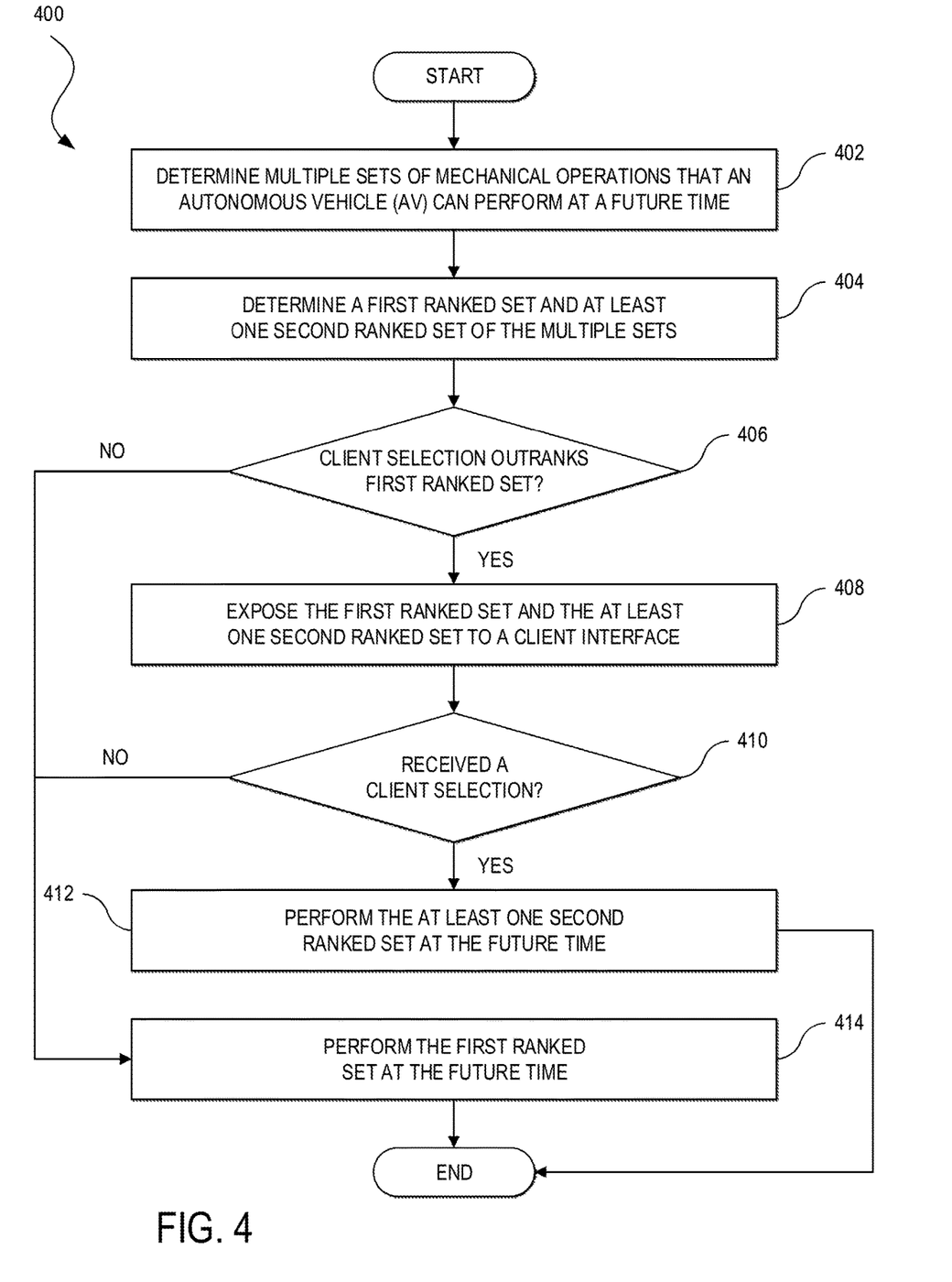
FIG. 4 illustrates an example of a process for providing client control over an AV of an AV ridesharing service in accordance with an embodiment.

FIG. 4 illustrates an example of a process 400 for providing client control over the AV 102 before, during, or after a trip provided by the AV ridesharing service 100. One of ordinary skill will understood that, for any flow, method, or process discussed herein, there can be additional, fewer, or alternative steps performed in similar or alternative orders, or in parallel, within the scope of the various embodiments unless otherwise stated.

The process 400 can be initiated with step 402 in which the AV 102 can determine multiple sets of one or more mechanical operations that the AV 102 can perform at a future time. For example, the AV 102 can receive location, speed, and direction data of the AV 102 (e.g., via the localization service 200), map or route information (e.g., via the mapping service, the routing service 204, the remote computing system 150, etc.), data regarding other objects on the road with the AV 102 or events occurring around the AV 102 (e.g., via the object and event classification service 206), traffic rules and other safety standards or practices for the road (e.g., via the rules engine 208), whether the turn signal has been activated (e.g., via the signaling service 216), and so forth. The AV 102 can process the data and determine the multiple sets of mechanical operations that the AV 102 can perform at the future time (e.g., via the mechanical operations generation service 210).

As discussed above, the multiple sets of mechanical operations can correspond to operations for changing to a specific lane, operations for navigating the AV (e.g., going straight, turning left, turning right, stopping, etc.), operations for accelerating, decelerating, or maintaining the same speed, operations for handling driving blockages (e.g., honking the horn, high-beaming, going around the blockage, etc.), operations to drive to specific locations for picking up or dropping off passengers, operations to dwell at certain locations for specified periods of time, operations for taking alternative routes to a pick-up or drop-off location, or other operations suitable for giving client control over the mechanical systems 130-138.

In some embodiments, the AV 102 can eliminate or filter out sets of mechanical operations that are predicted to result in a collision or are otherwise unsafe, sets of mechanical operations that are illegal, sets of mechanical operations that are determined to be ineffective (e.g., sounding the horn in a noisy environment, flashing high beams on a sunny day, etc.), and other sets of mechanical operations determined to be invalid (e.g., as set forth in the rules engine 208).

At step 404, the AV 102 can determine a ranking for each set of mechanical operations. For example, the AV 102 can determine the rankings based on conditions and preferences set forth in the rules engine 208, which can be specified by an operator of the AV ridesharing service 100 or a user via the ridesharing application 160. The preferences can include lane preferences (e.g., carpool lane, turning lane when the AV 102 is within a specified distance of a turn, etc.), route preferences (e.g., shortest-distance route, fastest route, etc.), AV ridesharing service objectives (e.g., fuel or battery efficiency, maximizing utilization of an AV fleet, maximizing the number of trips, maximizing fares, etc.), trip conditions (e.g., maximum trip time, maximum trip fare, minimum distance from a refueling or recharging station, etc.), and so forth. The AV 102 can determine a first ranked set and at least one second ranked set from the multiple sets of mechanical operations determined at step 402.

The process 400 can then proceed to decision block 406 in which the AV 102 can determine whether an AV ridesharing service user (e.g., a passenger, a human co-pilot, a parent or guardian of a child passenger or other privileged remote user, a delivery customer, a remote computing system user, etc.) can help the AV 102 with selecting the set mechanical operations ultimately taken at the future time (e.g., whether the user can override a default set of operations or the first ranked set of operations determined at step 404). As discussed, the AV 102 can take client or user selection into consideration when determining which of the sets of mechanical operations to actually perform. For example, user selection can be given a score, weight, or other value. The AV 102 can apply this value to the second ranked set of mechanical operations to determine the adjusted rankings for the second ranked set. If the adjusted ranking of the second ranked set outranks a ranking of the first ranked set, then the process 400 can proceed to step 408. Otherwise, the process 400 can conclude with step 414 in which the AV 102 can perform the first ranked set of mechanical operations at the future time.

At step 408, the AV 102 can expose the first ranked set and the second ranked set to a client interface (e.g., the user interface 120 of the local computing system 110, the ridesharing application 160, etc.). In this manner, the AV 102 can present sets of mechanical operations from which a user can select under appropriate circumstances, and ensure those options are safe, legal, and otherwise valid. This can provide a better user experience as the AV 102 can be more responsive (or appear to be more responsive) to the user's preferences by explicitly giving users control over the AV 102 when suitable, and avoid scenarios in which the user selects a different set of mechanical operations that may not actually be performed by the AV 102 for various reasons discussed herein.

The client interface can use a local connection (e.g., a wired connection, WLAN, Bluetooth®, infrared, etc.) for communicating the user selection to the AV 102. The local connection can be implemented by the local computing system 110, such as via the user interface 120 or the ridesharing application 160. The local connection can also be provided by the user's mobile computing device. For example, when the user's mobile computing device is located within a certain range of the AV 102, the AV 102 can configure the user's device (e.g., via the ridesharing application 160) and/or the local computing system 110 to use the local connection to more directly communicate with the AV 102. This can reduce latency and bandwidth usage and increase security and dependability, among other benefits.

The client interface can be a GUI including elements corresponding to the sets of mechanical operations displayed on a user's mobile computing device (e.g., smart phone, smart watch, smart glasses or other head-mounted display, etc.) or one or more tablets or other computing devices with touchscreens inside the AV 102, a VUI (e.g., executing on the user's smart phone, head-mounted display, smart ear pods or other in-ear, on-ear, or over-ear device or one or more computing devices with a microphone inside the AV 102, etc.) that is configured to accept voice commands corresponding to the sets of mechanical operations, or a gesture-based user interface (e.g., executing on the user's smart phone, smart watch, or head-mounted display or one or more computing devices with a camera inside the AV 102, etc.) that is configured to recognize gestures corresponding to the sets of mechanical operations.

From step 408, the process 400 can continue to decision block 410 in which the AV 102 may wait for a specified time to receive a selection of the second ranked set from the client interface. For example, the client interface can receive a selection via one or more clicks or taps on the GUI element corresponding to the second ranked set, a voice command corresponding to the second ranked set, or a gesture corresponding to the second ranked set, and the process 400 may conclude at step 412 at which the AV 102 performs the second ranked set at the future time. If the client interface does not receive a selection within the specified time, the process 400 can conclude at step 414 in which the AV 102 can perform the first ranked set at the future time.

Figure 5:
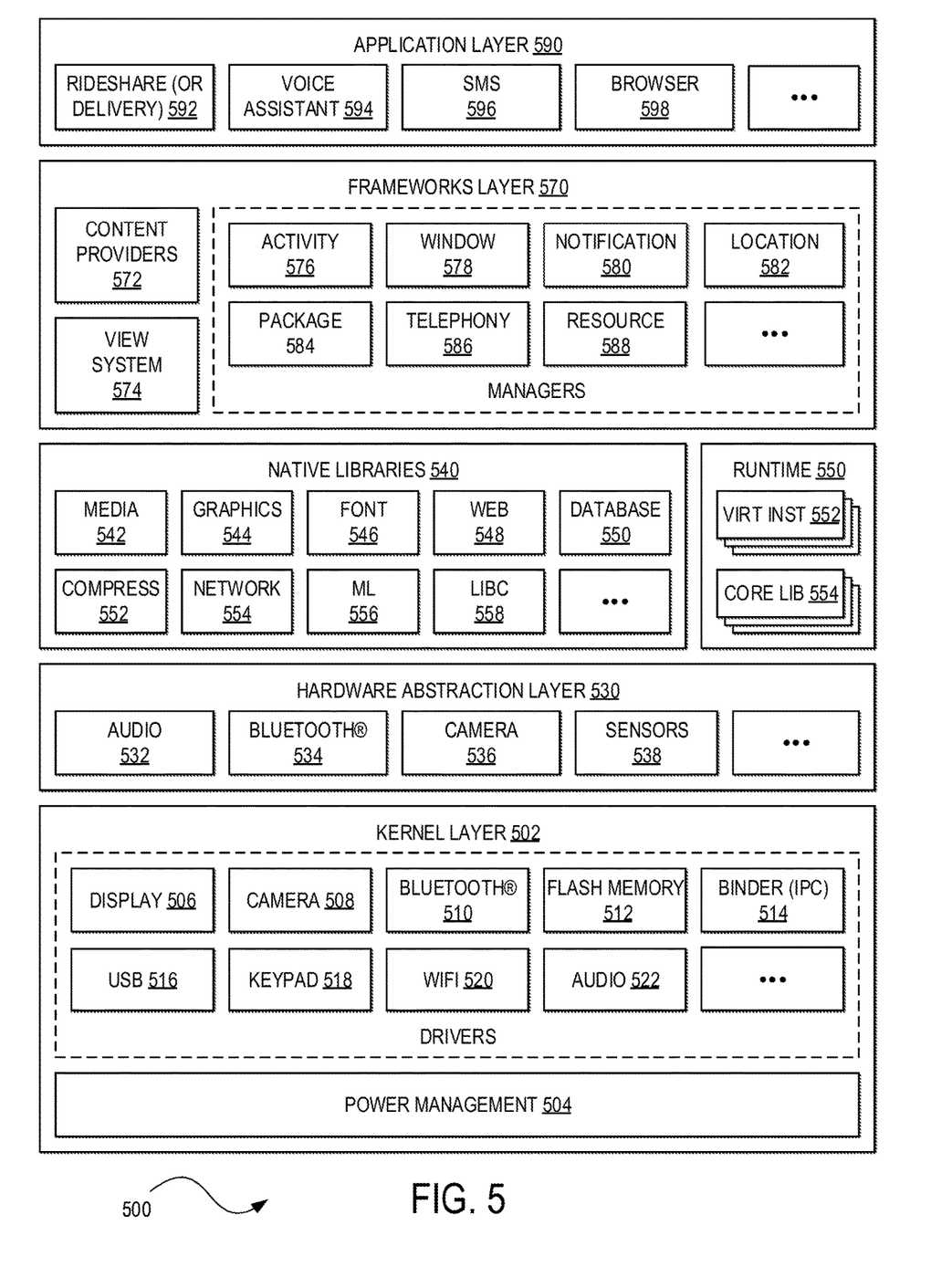
FIG. 5 illustrates an example of a software architecture for a computing system in accordance with an embodiment.

FIG. 5 illustrates an example of a software architecture 500 for a mobile computing device, such as a tablet computer, a mobile phone, a wearable device (e.g., a smart watch, smart glasses or other head-mounted display (HMD), smart ear pods or other in-ear, on-ear, or over-ear device, etc.), and so forth. Although the software architecture 500 is particularly suitable for a mobile computing device, one of ordinary skill in the art will understand that other embodiments may employ other software architectures suitable for computing devices of other form factors.

The software architecture 500 may be conceptualized as a stack of layers in which each layer provides particular functionality. For example, the software architecture 500 may include layers such as a kernel layer 502, a hardware abstraction layer 530, native libraries 540, a runtime engine 560, a frameworks layer 570, and an applications layer 590. Operationally, applications of the applications layer 590 and/or other modules/components in the other layers may invoke Application Programming Interface (API) calls through the software stack and receive a response, returned values, and so forth, as messages. The layers illustrated are representative in nature and not all software architectures have all layers. For example, some mobile or special-purpose operating systems may not provide a frameworks layer 570, while others may provide such a layer. Other software architectures may include additional or different layers.

The foundation of the software architecture 500 is the kernel layer 502, which can provide operating system functionalities, such as power management 504, low-level memory management (not shown), process management (e.g., scheduling, threading, etc.) (not shown), networking (not shown), security (not shown), logging (not shown), and so forth. In addition, the kernel layer 502 may include a driver model to enable device manufacturers to develop hardware drivers for a common, well-known kernel. For example, the kernel layer 502 may include one more display drivers 506, camera drivers 508, Bluetooth® drivers 510, Flash memory drivers 512, binder (Inter-Process Communications (IPC) drivers 514, serial communication drivers (e.g., USB) 516, keypad drivers 518, Wi-Fi drivers 520, and audio drivers 522, among others, depending on the hardware configuration. In some embodiments, the kernel layer 502 may be based on the open-source Linux® kernel.

The hardware abstraction layer 530 can provide standard interfaces that expose device hardware capabilities to higher-level layers of the software architecture 500, such as the native libraries 540, the runtime engine 560, the frameworks layer 570, and so forth. The hardware abstraction layer 530 can comprise multiple modules, each of which can implement an interface for a specific type of hardware component, such as an audio module 532, a Bluetooth® module 534, a camera module 536, and a sensors module 538, among others. When a component of a higher-level layer makes a call to access device hardware, the module for that hardware can be loaded.

In some embodiments, some of the components of the software architecture 500, such as the hardware abstraction layer 530 and the runtime engine 560, may be built from code that require native libraries written in a programming language, such as C and C++. Higher-level layers, such as the frameworks layer 570, may expose the functionality of some of these native libraries to applications of the applications layer 590. In this example, the native libraries 540 may include one or more media framework libraries 542 (e.g., Native Media APIs and/or other libraries to support presentation and manipulation of various media formats, such as Moving Picture Experts Group (MPEG) 4 (MPEG-4 or MP4), H.264, MPEG 3 (MP3), Advanced Audio Coding (AAC), Adaptive Multi-Rate (AMR), Joint Photographic Experts Group (JPEG or JPG), Portable Network Graphics (PNG), etc.), graphics rendering libraries 544 (e.g., Open Graphics Library (OpenGL®), Scalable Graphics Library (SGL), etc.), font rendering libraries 546 (e.g., FreeType), webpage rendering libraries 548 (e.g., WebKit), database management libraries 550 (e.g., Structured Query Language), data compression libraries 552 (e.g., zlib), networking libraries 554 (e.g., Secure Sockets Layer (SSL), Native Multinetwork APIs, etc.), machine learning libraries 556 (e.g., Neural Networks API), and libc 558 (e.g., C standard library for providing memory allocation functions, string manipulation functions, mathematic functions, etc.). The native libraries 540 may also include a wide variety of other libraries to provide other native APIs to the elements of the frameworks layer 570, applications layer 590, and other software components/modules.

In some embodiments, each application executing in the software architecture 500 can run in its own process within its own virtual instance 562 (e.g., virtual machine, container, etc.) of the runtime engine 560. The runtime engine 560 may run multiple virtual instances by executing byte code files, such as Dalvik Executable (DEX) files or other format designed for mobile computing devices (e.g., optimized for minimal memory utilization). Some of the features of the runtime engine 560 can include ahead-of-time and just-in-time compilation, optimized garbage collection, conversion of byte code into more compact machine code, and advanced debugging support (e.g., dedicated sampling profiler, detailed diagnostic exceptions and crash reporting, watchpoints for monitoring specific fields, etc.). The runtime engine 560 can also include core libraries 564 for providing interoperability between a particular programming language and the virtual instance 562, and expose the core APIs for that programming language, including data structures, utilities, file access, network access, and graphics, among others.

The frameworks layer 570 can comprise a set of services through which applications of the applications layer 590 interact. These services can manage the basic functions of a mobile computing device, such as resource management, voice call management, and data sharing, among others. In this example, the frameworks layer includes content providers 572, a view system 574, and a number of managers. The content providers 572 can enable applications to access data from other applications, such as a contacts application (not shown) or a calendar application (not shown), and to share their own data. The view system 574 can be used to build an application's user interface, including lists, grids, text boxes, buttons, an embeddable web browser, and so forth. The managers can include an activity manager 576, a window manager 578, a notification manager 580, a location manager 582, a package manager 584, a telephony manager 586, and a resource manager 588, among others. The activity manager 576 can control the activity life cycle of applications and can provide a common navigation back stack. The window manager 578 can be responsible for organizing contents of a display screen of a mobile computing device. The notification manager 580 can allow applications to display customs alerts and notifications. The location manager 582 can provide for location services, such as determining the location of a mobile computing device by a Global Positioning System (GPS), a cellular network, a Wi-Fi network, or other location system. The package manager 584 can enable the applications of the application layer 590 to determine information about other applications currently installed on a device. The telephony manager 586 can be responsible for voice calls. The resource manager 588 can provides access to various types of non-code resources, such as localized strings, graphics, user interface layouts, and so forth.

The frameworks layer 570 can also include various hardware device managers not shown in the software architecture 500, such as one or more camera managers, Bluetooth® managers, Wi-Fi managers, USB managers, and sensor managers (e.g., gyroscopes, accelerometers, magnetometers, proximity sensors, temperature sensors, light sensors, pressure sensors, humidity sensors, etc.), among others.

Located at the top of the software architecture 500 is the applications layer 590, which can comprise various applications, such as a ridesharing application 592, a voice assistant application 594, a Short Messaging Service (SMS) application 596, a web browser 598, and so forth.

Figure 6A:
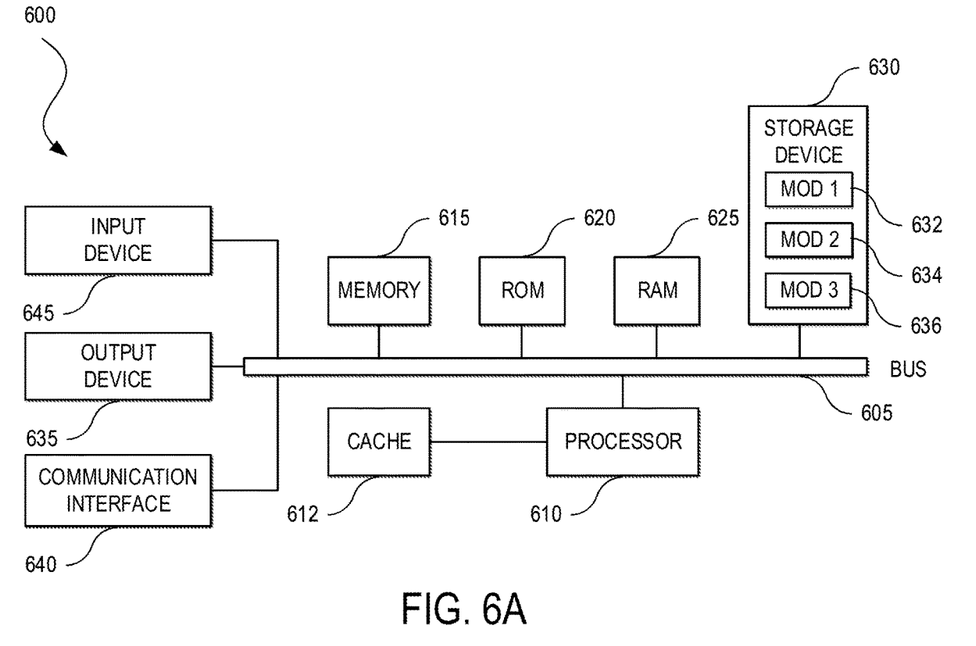
FIGS. 6A and 6B illustrate examples of computing systems in accordance with some embodiments.
Figure 6B:
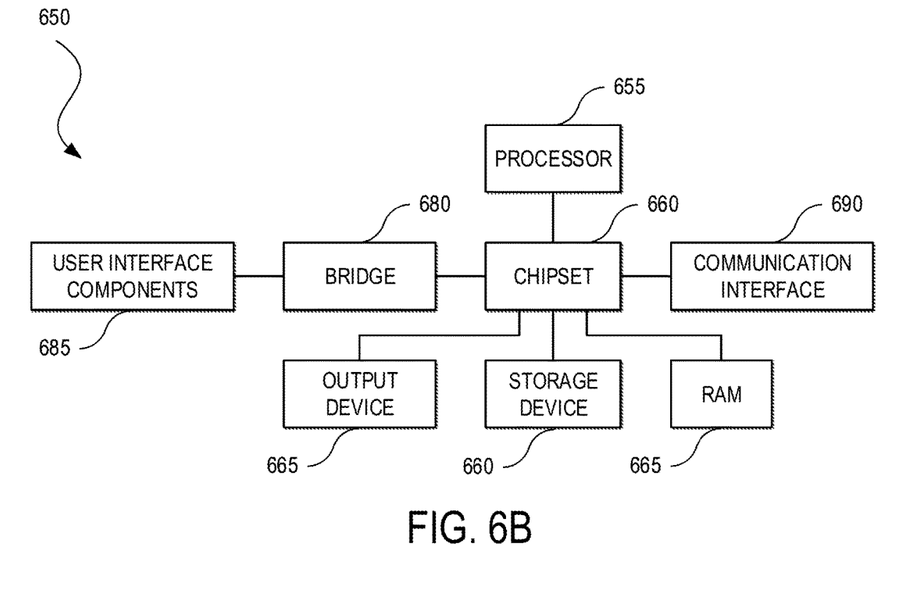

FIG. 6A and FIG. 6B illustrate systems in accordance with various embodiments. The more appropriate system will be apparent to those of ordinary skill in the art when practicing the various embodiments. Persons of ordinary skill in the art will also readily appreciate that other systems are possible.

FIG. 6A illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function.

FIG. 6B illustrates an example architecture for a chipset computing system 650 that can be used in accordance with an embodiment. The computing system 650 can include a processor 655, representative of any number of physically and/or logically distinct resources capable of executing software, firmware, and hardware configured to perform identified computations. The processor 655 can communicate with a chipset 660 that can control input to and output from the processor 655. In this example, the chipset 660 can output information to an output device 665, such as a display, and can read and write information to storage device 670, which can include magnetic media, solid state media, and other suitable storage media. The chipset 660 can also read data from and write data to RAM 675. A bridge 680 for interfacing with a variety of user interface components 685 can be provided for interfacing with the chipset 660. The user interface components 685 can include a keyboard, a microphone, touch detection and processing circuitry, a pointing device, such as a mouse, and so on. Inputs to the computing system 650 can come from any of a variety of sources, machine generated and/or human generated.

The chipset 660 can also interface with one or more communication interfaces 690 that can have different physical interfaces. The communication interfaces 690 can include interfaces for wired and wireless Local Area Networks (LANs), for broadband wireless networks, as well as personal area networks. Some applications of the methods for generating, displaying, and using the technology disclosed herein can include receiving ordered datasets over the physical interface or be generated by the machine itself by the processor 655 analyzing data stored in the storage device 670 or the RAM 675. Further, the computing system 650 can receive inputs from a user via the user interface components 685 and execute appropriate functions, such as browsing functions by interpreting these inputs using the processor 655.

It will be appreciated that computing systems 600 and 650 can have more than one processor 610 and 655, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   determining, by an Autonomous Vehicle (AV), multiple sets of one or more mechanical operations of mechanical systems of the AV that the AV can alternately perform at a future time;
   determining, by the AV, a first ranked set of mechanical operations that the AV can perform at the future time and a second ranked set of mechanical operations that the AV can perform at the future time from among the multiple sets;
   determining, by the AV, that the first ranked set of mechanical operations outranks the second ranked set of mechanical operations in an initial ranking, wherein the initial ranking is based on one or more AV ride-sharing objectives that include at least one of a fuel efficiency objective, a battery efficiency objective, and an AV fleet utilization objective;
   evaluating, by the AV, whether a score associated with a passenger selection of the second ranked set of mechanical operations can override the initial ranking;
   in response to a determination that the score associated with the passenger selection of the second ranked set of mechanical operations can override the initial ranking, presenting the initial ranking on a client interface;
   receiving, via the client interface, a client selection of the second ranked set of mechanical operations;
   based on the client selection of the second ranked set, adjusting the initial ranking to generate an adjusted ranking, wherein the adjusted ranking indicates to the AV that the second ranked set of mechanical operations outranks the first ranked set of mechanical operations; and
   performing, by the AV, the second ranked set of mechanical operations at the future time in response to receiving the client selection within a specified time.

2. The computer-implemented method of claim 1, further comprising:
   determining second multiple sets of mechanical operations the AV can perform at a second future time;
   determining a first ranked set and a second ranked set from among the second multiple sets;
   exposing the first ranked set of the second multiple sets and the second ranked set of the second multiple sets to the client interface; and
   performing, at the second future time, the first ranked set of the second multiple sets in response to a second specified time elapsing without the client interface receiving a selection of the second ranked set of the second multiple sets.

3. The computer-implemented method of claim 1, wherein the client interface is presented on a touchscreen of the AV.

4. The computer-implemented method of claim 1, wherein the client interface is presented on a touchscreen of a user's mobile computing device.

5. The computer-implemented method of claim 4, further comprising:
   configuring at least one of the AV or the user's mobile computing device to receive the selection of the second ranked set via a local connection between the AV and the user's mobile computing device.

6. The computer-implemented method of claim 1, wherein the client interface is a voice user interface executing on one of a user's mobile computing device or a computing device of the AV.

7. The computer-implemented method of claim 1, further comprising:
   detecting a driving blockage;
   determining the multiple sets of one or more mechanical operations the AV can perform at the future time in response to the driving blockage;
   determining an environmental state around the AV from a sensor of the AV; and
   eliminating at least one set of the multiple sets based on the environmental state around the AV.

8. The computer-implemented method of claim 7, wherein the multiple sets correspond to multiple routes to a pick-up or drop-off location.

9. The computer-implemented method of claim 8, further comprising:
   determining one or more undriveable areas to the pick-up or drop-off location; and
   eliminating at least one route from the multiple routes based on the one or more undriveable areas.

10. The computer-implemented method of claim 7, wherein the multiple sets correspond to multiple pick-up or drop-off locations.

11. The computer-implemented method of claim 10, further comprising:
    determining traffic laws associated with a geographic area of the multiple pick-up or drop-off locations; and eliminating at least one pick-up or drop-off location from the multiple pick-up or drop-off locations based on the traffic laws.

12. The computer-implemented method of claim 1, wherein the AV excludes at least one of a steering wheel, a foot brake pedal, a foot accelerator pedal, or a turn signal lever.

13. The computer-implemented method of claim 1, wherein at least one set of the multiple sets of one or more mechanical operations includes a turn and wherein the one or more mechanical operations includes turning on a blinker of the AV, decelerating, and turning.

14. An Autonomous Vehicle (AV), comprising:
one or more processors;
one or more mechanical systems; and
memory including instructions that, when executed by the one or more processors, cause the AV to:
determine multiple sets of one or more mechanical operations of the one or more mechanical systems that the AV can control to alternately perform at a future time;
determine a first ranked set of mechanical operations that the AV can perform at the future time and a second ranked set of mechanical operations that the AV can perform at the future time from among the multiple sets;
determine that the first ranked set of mechanical operations outranks the second ranked set of mechanical operations in an initial ranking, wherein the initial ranking is based on one or more AV ridesharing objectives that include at least one of a fuel efficiency objective, a battery efficiency objective, and an AV fleet utilization objective;
evaluate whether a score associated with a potential passenger selection of the second ranked set of mechanical operations can override the initial ranking if selected by a passenger based on application of a weight to the score associated with the potential passenger selection of the second ranked set of mechanical operations;
in response to a determination that the score associated with the potential passenger selection of the second ranked set of mechanical operations can override the initial ranking, present the initial ranking on a client interface;
receive, via the client interface, a client selection of the second ranked set of mechanical operations;
based on the client selection of the second ranked set, adjusting the initial ranking to generate an adjusted ranking, wherein the adjusted ranking indicates to the AV that the second ranked set of mechanical operations outranks the first ranked set of mechanical operations; and
perform the second ranked set of mechanical operations at the future time in response to receiving the client selection within a specified time.

15. The AV of claim 14, wherein the multiple sets correspond to multiple lanes of a road on which the AV is currently traveling.

16. The AV of claim 15, wherein the multiple sets correspond to multiple dwell times at a pick-up or drop-off location.

17. The AV of claim 14, wherein the instructions, when executed, further cause the AV to:
determine second multiple sets of one or more operations, of the one or more mechanical systems that the AV can control, to perform at a second future time;
determine a first ranked set from among the second multiple sets;
determine that no adjusted ranking of a client selection of each set of the second multiple sets outranks a ranking of the first ranked set of the second multiple sets; and
disable selection of each of the second multiple sets from the client interface for the second future time.

18. A non-transitory computer-readable storage medium including instructions that, upon being executed by one or more processors of an Autonomous Vehicle (AV), cause the AV to:
determine multiple sets of one or more mechanical operations for mechanical systems of the AV that the AV can alternately perform at a future time;
determine a first ranked set of mechanical operations that the AV can perform at the future time and a second ranked set of mechanical operations that the AV can perform at the future time from among the multiple sets;
determine that the first ranked set of mechanical operations outranks the second ranked set of mechanical operations in an initial ranking, wherein the initial ranking is based on one or more AV ridesharing objectives that include at least one of a fuel efficiency objective, a battery efficiency objective, and an AV fleet utilization objective;
evaluate whether a score associated with a passenger selection of the second ranked set of mechanical operations can override the initial ranking;
in response to a determination that the score associated with the passenger selection of the second ranked set of mechanical operations can override the initial ranking, present the initial ranking on a client interface;
receive, via the client interface, a client selection of the second ranked set of mechanical operations;
based on the client selection of the second ranked set of mechanical operations, adjust the initial ranking to generate an adjusted ranking, wherein the adjusted ranking indicates to the AV that the second ranked set of mechanical operations outranks the first ranked set of mechanical operations; and
perform the second ranked set of mechanical operations at the future time in response to receiving the client selection within a specified time.

19. The non-transitory computer-readable storage medium of claim 18, wherein the multiple sets correspond to multiple routes to a pick-up or drop-off location.

20. The non-transitory computer-readable storage medium of claim 18, wherein the multiple sets correspond to multiple pick-up or drop-off locations.

* * * * *